Dec. 6, 1927.
R. D. ANANSON
MOTOR VEHICLE FAN MECHANISM
Filed Jan. 21, 1927
1,651,356
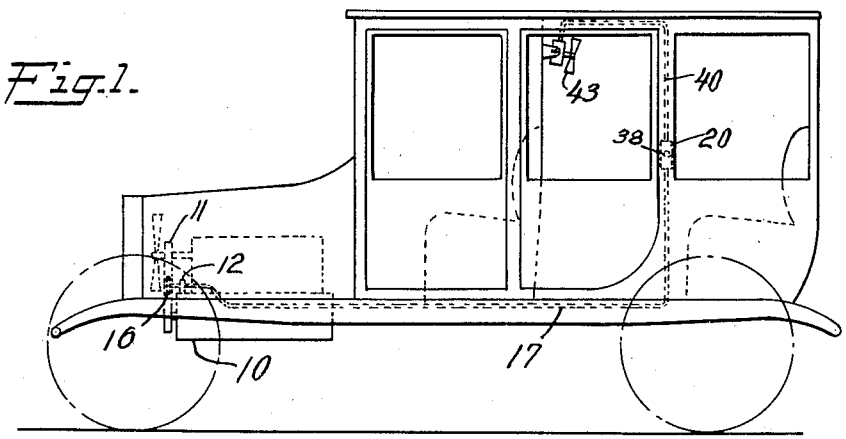
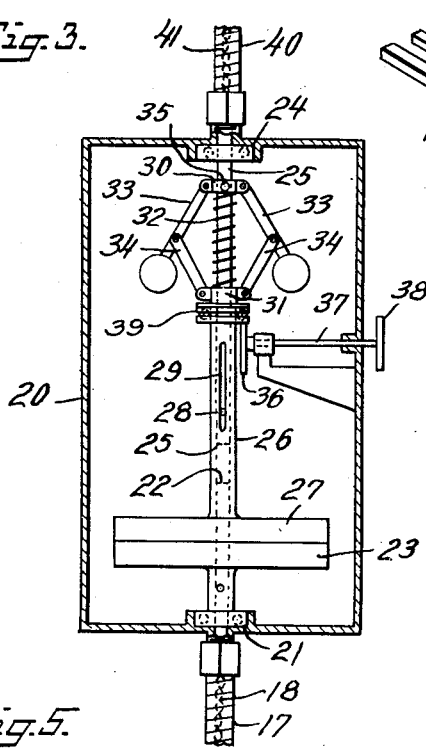
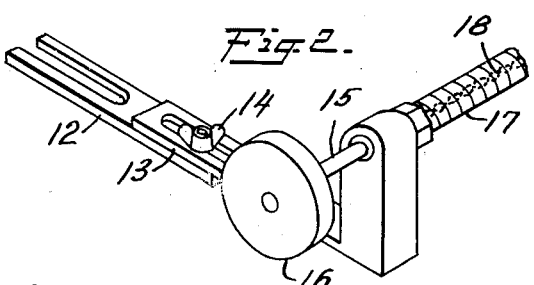
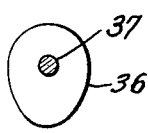
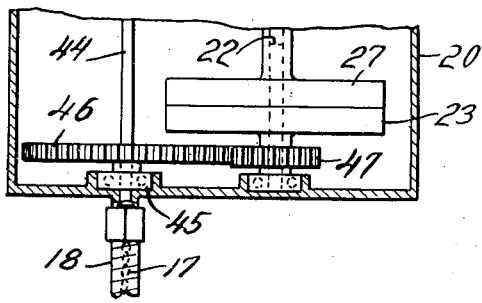
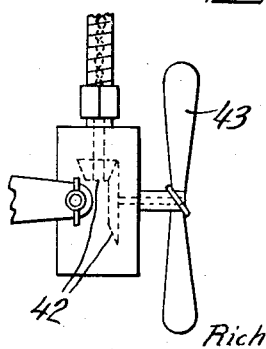
INVENTOR
Richard D. Ananson
BY
Marshall & Stanley
ATTORNEYS Patented Dec. 6, 1927.

1,651,356

UNITED STATES PATENT OFFICE.

RICHARD D. ANANSON, OF STIRLING, NEW JERSEY.

MOTOR-VEHICLE-FAN MECHANISM.

Application filed January 21, 1927. Serial No. 162,669.

This invention relates to improvements in motor vehicle fan mechanisms and its object is to provide a simple apparatus for driving an air circulating fan from the motor of the vehicle with the fan located in a desired part of the automobile remote from the motor. This device is adapted, for example, to drive a cooling fan in the passenger compartment of a closed taxicab.

Another object of the invention is to provide a mechanism by which a fan is driven at a substantially constant rate of speed and at adjustably different desired rates of speed regardless of changes in the speed of the motor.

A still further object is to provide at a point convenient to a passenger, a control device by means of which the fan may be turned on or off and its speed regulated.

These and other objects of the invention will appear from the following specification.

Referring to the drawings, Fig. 1 is an outline elevation of an automobile with my invention applied thereto;

Fig. 2 is a perspective view of a bracket and friction drive device for actuating the mechanism from a movable part of an internal combustion engine, in this case from its fan belt;

Fig. 3 is a front elevation of the control mechanism;

Fig. 4 is a side elevation of a cam which forms a part of the control mechanism;

Fig. 5 is a front elevation of a part of a control mechanism of modified construction; and Fig. 6 is a side elevation of the fan.

Like characters of reference designate corresponding parts in the different figures of the drawings.

10 designates the frame of an automobile motor of the internal combustion type and 11, its fan belt. 12 is the lower member of a bracket and this member is adapted to be secured to the motor frame 10. The upper part 13 of this bracket is slidable on the lower part and is arranged to be adjustably secured thereto by a wing nut 14. This upper part holds a bearing, preferably of an anti-friction type, for a shaft 15 which carries a friction wheel 16. These parts are so arranged as to hold the friction wheel 16 in driving engagement with the belt 11.

17 is a flexible cable within which is a power transmitting member 18 which may be a chain as shown, or a flexible wire. One end of this power transmitting member is mechanically connected for rotation by the shaft 15.

20 is a control box in one end of which is an anti-friction bearing 21 which supports the stub shaft 22 to which is affixed a friction disk 23. An anti-friction bearing 24 supports another shaft 25 in alinement with the stub shaft 22. 26 is a sleeve slidable on the shafts 22 and 25 and rotatable on the stub shaft 22. A friction disk 27 is affixed to the lower end of the sleeve 26 directly over the disk 23. A pin 28 in shaft 25 projects through a slot 29 in the sleeve 26 so that the sleeve and shaft may move longitudinally in relation to each other but must rotate together.

Affixed to the shaft 25 is a collar 30 and a similar collar 31 is affixed to the sleeve 26. A spring 32 is interposed between these collars. 33, 33 are weighted governor arms pivoted to the collar 30 and 34, 34 are links connecting the collar 31 with the governor arms 33. The position of the collar 30 on shaft 25 may be adjusted by means of a set screw 35. 36 is a cam affixed to a rod 37 supported in suitable bearings and having on the outside of the box 20 an adjusting dial 38. This cam is arranged to engage the underside of an anti-friction bearing 39 directly below the collar 31.

The end of the power transmitting member 18 is mechanically coupled to the stub shaft 22 so that the latter and the friction disk 23 are rotated by the rotation of the friction wheel 16.

To the upper end of shaft 25 is coupled another power transmitting member 41 within a flexible cable 40 which extends to and drives the gears 42 of the fan 43.

Before describing the modification shown in Fig. 5, the operation of this device will be pointed out. It has been shown that at any time the engine is running, the friction disk 23 will be rotated. When it is not desired to use the fan, the cam 36 is so adjusted by means of the dial 38 as to raise the collar 31 and sleeve 26 to hold the friction disk 27 out of engagement with the friction disk 23. By turning the cam 36 a desired amount, the sleeve 26 will be lowered to bring its friction disk 27 into engagement with the rotating friction disk 23 and by the mechanical connections shown, this will cause rotation of the fan 43. If the rate of rotation of the fan tends to exceed a predetermined rate, the governor arms 33 will spread apart and partially release the engagement between the friction disks 23 and 27. By different adjustments of the cam 36, the rate of fan rotation may be predetermined.

This adjustment is so arranged that the fan may be rotated as rapidly as desired when the motor is idling as, for example, when the automobile is stopped at crossings at which time the air circulation produced by the fan is most desired. When the motor speed is increased, the rotation of the fan will not be increased materially because of the action of the governor.

In some cases it is desired to increase the relative rotation of the fan to that of the engine and to meet such requirements, the modification illustrated in Fig. 5 is provided. In this case, the end of the power transmitting member 18 is mechanically coupled with a counter-shaft 44 supported in anti-friction bearings, such as 45, instead of being directly connected with stub shaft 22. 46 is a gear affixed to counter-shaft 44 which is in mesh with a smaller gear 47 which is affixed to the stub shaft 22.

One of the advantages of this device is that it is easily applied to any automobile. The control box may be placed near the passenger's seat, and the fan located wherever desired. As the power transmission mechanism between the control box and the fan is flexible, the fan may be moved from one position to another to suit the convenience of the user.

A preferred form of mechanism which embodies this invention has been shown and described but it is possible to embody this invention in mechanisms of other designs and of different construction and I intend no limitations other than those imposed by the appended claims.

What I claim is:

1. Motor vehicle fan mechanism comprising a flexible power transmitting member, arranged to be actuated by a vehicle motor, a fan operatively connected with said member, and a speed control device interposed between the motor and the fan for regulating the speed of the fan without changing the motor speed.

2. Motor vehicle fan mechanism comprising a flexible power transmitting member, arranged to be actuated by a vehicle motor, a fan operatively connected with said member, and a control device interposed between the motor and the fan, said device comprising a speed governor for regulating the speed of the fan without changing the motor speed.

3. Motor vehicle fan mechanism comprising a flexible power transmitting member, arranged to be actuated by a vehicle motor, a fan operatively connected with said member, a control device, for regulating the speed of the fan, interposed between the motor and the fan, said device comprising a speed governor, and manually actuated means for adjusting the governor.

4. Motor vehicle fan mechanism comprising a device arranged to be driven from a rotating part of a vehicle motor, a control device located at a point remote from said motor, power transmitting means between the driven device and the control device, and a fan operatively connected with the control device.

5. Motor vehicle fan mechanism comprising a device arranged to be driven from a rotating part of a vehicle motor, a speed control device located at a point remote from said motor, a flexible power transmitting member between the driven device and the control device, a fan, and a flexible power transmitting member between the control device and the fan.

6. Motor vehicle fan mechanism comprising a device arranged to be driven from a rotating part of a vehicle motor, a control device located at a point remote from said motor comprising a friction clutch, a speed governor and manual means for adjusting the clutch and the governor, a flexible power transmitting member between the driven device and the control device and a fan operatively connected with the control device.

7. Motor vehicle fan mechanism comprising a bracket arranged to be affixed to the frame of a vehicle motor having a fan belt and to rotatively support a wheel in frictional engagement with the belt, a control device located at a point remote from said motor comprising a friction clutch, a speed governor and manual means for adjusting the clutch and the governor, power transmitting means connecting the friction wheel and the control device, a fan and a power transmitting means between the control device and the fan.

8. Motor vehicle fan mechanism comprising a bracket arranged to be affixed to the frame of a vehicle motor having a fan belt and to rotatively support a wheel in frictional engagement with the belt, a control device located at a point remote from said motor comprising a friction clutch, a speed governor and manual means for adjusting the clutch and the governor, a flexible power transmitting member connecting the friction wheel and the control device, a fan and a flexible power transmitting member between the control device and the fan.

In witness whereof, I have hereunto set my hand this 10th day of January, 1927.

RICHARD D. ANANSON.